United States Patent
Venkatesha et al.

(10) Patent No.: US 12,165,064 B2
(45) Date of Patent: Dec. 10, 2024

(54) METHOD AND SYSTEM WITH DEEP LEARNING MODEL GENERATION

(71) Applicant: Samsung Electronics Co., Ltd., Suwon-si (KR)

(72) Inventors: Yeshwanth Venkatesha, Bangalore (IN); Sundeep Krishnadasan, Bangalore (IN); Ankur Deshwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1025 days.

(21) Appl. No.: 16/549,299

(22) Filed: Aug. 23, 2019

(65) Prior Publication Data

US 2020/0104716 A1    Apr. 2, 2020

(30) Foreign Application Priority Data

Aug. 23, 2018  (IN) ............................. 201841031680
Aug. 20, 2019  (IN) ............................. 201841031680
Aug. 23, 2019  (KR) ........................ 10-2019-0103841

(51) Int. Cl.
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
CPC ............ G06N 3/04; G06N 3/08; G06N 3/082; G06N 3/0454
See application file for complete search history.

(56) References Cited

U.S. PATENT DOCUMENTS

| 5,787,408 A | 7/1998 | Deangelis |
| 2013/0138589 A1* | 5/2013 | Yu ............................. G06N 3/08 706/15 |

(Continued)

FOREIGN PATENT DOCUMENTS

| DE | 20 2017 106 532 U1 | 3/2018 |
| KR | 10-2018-0084289 A | 7/2018 |

(Continued)

OTHER PUBLICATIONS

Han, Song, Huizi Mao, and William J. Dally. "Deep compression: Compressing deep neural networks with pruning, trained quantization and huffman coding." arXiv preprint arXiv:1510.00149v5 (2016). (Year: 2016).*

(Continued)

*Primary Examiner* — Randall K. Baldwin
(74) *Attorney, Agent, or Firm* — NSIP Law

(57) ABSTRACT

Provided is a method and system with deep learning model generation. The method includes identifying a plurality of connections in a neural network that is pre-associated with a deep learning model, generating a plurality of pruned neural networks by pruning different sets of one or more of the plurality of connections to respectively generate each of the plurality of pruned neural networks, generating a plurality of intermediate deep learning models by generating a respective intermediate deep learning model corresponding to each of the plurality of pruned neural networks, and selecting one of the plurality of intermediate deep learning models, having a determined greatest accuracy among the plurality of intermediate deep learning models, to be an optimized deep learning model.

22 Claims, 4 Drawing Sheets

(56) References Cited

U.S. PATENT DOCUMENTS

| | | | |
|---|---|---|---|
| 2015/0100530 A1 | 4/2015 | Mnih et al. | |
| 2015/0379429 A1* | 12/2015 | Lee | G09B 5/00 |
| | | | 706/11 |
| 2016/0342888 A1 | 11/2016 | Yang et al. | |
| 2018/0046906 A1* | 2/2018 | Dally | G06N 3/04 |
| 2018/0114114 A1* | 4/2018 | Molchanov | G06N 3/084 |
| 2018/0137417 A1* | 5/2018 | Theodorakopoulos | |
| | | | G06N 3/082 |
| 2018/0204110 A1 | 7/2018 | Kim et al. | |
| 2019/0050734 A1* | 2/2019 | Li | G06N 3/04 |
| 2019/0080238 A1* | 3/2019 | Wang | G06N 3/082 |
| 2019/0108436 A1* | 4/2019 | David | G06N 3/02 |
| 2019/0130271 A1* | 5/2019 | Narang | G06N 3/082 |
| 2019/0188567 A1* | 6/2019 | Yao | G06N 3/04 |
| 2019/0197406 A1* | 6/2019 | Darvish Rouhani | G06N 20/00 |
| 2019/0197407 A1* | 6/2019 | Yao | G06F 17/16 |
| 2019/0251439 A1 | 8/2019 | Zoph et al. | |
| 2019/0362235 A1* | 11/2019 | Xu | G06N 3/04 |
| 2019/0370656 A1* | 12/2019 | Xie | G06N 3/082 |
| 2021/0182077 A1* | 6/2021 | Chen | G06T 1/60 |
| 2021/0182683 A1* | 6/2021 | Dai | G06N 3/0454 |
| 2021/0201526 A1* | 7/2021 | Moloney | G06N 3/0454 |
| 2021/0295174 A1* | 9/2021 | Zhang | G06N 3/045 |
| 2022/0036150 A1* | 2/2022 | Hassantabar | G06N 3/082 |
| 2022/0114455 A1* | 4/2022 | Samek | G06N 3/082 |
| 2022/0222534 A1* | 7/2022 | Dai | G06N 3/044 |

FOREIGN PATENT DOCUMENTS

| | | |
|---|---|---|
| WO | WO 2018/000309 A1 | 1/2018 |
| WO | WO 2018/081563 A1 | 5/2018 |

OTHER PUBLICATIONS

Li, Hao, et al. "Pruning filters for efficient convnets." arXiv preprint arXiv:1608.08710v3 (Mar. 2017): 1-13. (Year: 2017).*

Molchanov, Pavlo, et al. "Pruning convolutional neural networks for resource efficient inference." arXiv preprint arXiv:1611.06440 v2 (2017): 1-17 (Year: 2017).*

Liu, Jia, et al. "Structure learning for deep neural networks based on multiobjective optimization." IEEE transactions on neural networks and learning systems 29.6 (2017): 2450-2463. (Year: 2017).*

He, Yihui, et al. "AMC: AutoML for model compression and acceleration on mobile devices." arXiv preprint arXiv:1802.03494v2 (Aug. 19, 2018): 1-17. (Year: 2018).*

Han, Song, et al. "Learning both weights and connections for efficient neural network." Advances in neural information processing systems 28 (2015): 1-9 (Year: 2015).*

Dai, Xiaoliang, Hongxu Yin, and Niraj K. Jha. "Incremental Learning Using a Grow-and-Prune Paradigm with Efficient Neural Networks." arXiv preprint arXiv:1905.10952 (May 2019):1-10. (Year: 2019).*

Mostafa, Hesham, and Xin Wang. "Parameter Efficient Training of Deep Convolutional Neural Networks by Dynamic Sparse Reparameterization." arXiv preprint arXiv:1902.05967 v3 (May 2019) (Year: 2019).*

Cheng, Daheng, Zhengwu Yuan, and Yuanfeng Wu. "Remote Sensing Image Target Recognition Based on Pruned Deep Neural Network Models." 2018 IEEE 4th Information Technology and Mechatronics Engineering Conference (ITOEC). IEEE, 2018:1734-1738 (Year: 2018).*

Le, Q et al., "Using Machine Learning to Explore Neural Network Architecture", *Google Research Blog*, May 2017, pp. 1-3 (3 pages in English).

Ashok, A et al., "N2N Learning: Network to Network Compression via Policy Gradient Reinforcement Learning", *arXiv preprint arXiv:1709.06030*, Sep. 2017, pp. 1-21 (21 pages in English).

He, Y et al., "ADC: Automated Deep Compression and Acceleration with Reinforcement Learning", *arXiv:1802.03494v1*, Feb. 2108, pp. 1-12 (12 pages in English).

Pham, H et al., "Efficient Neural Architecture Search via Parameter Sharing", *arXiv:1802.03268v2*, Feb. 2018, pp. 1-11 (11 pages in English).

Zhou, Y et al., "Resource-Efficient Neural Architect", *arXiv:1806.07912v1*, Jun. 2018, pp. 1-14 (14 pages in English).

* cited by examiner

METHOD AND SYSTEM WITH DEEP LEARNING MODEL GENERATION

This application claims the benefit under 35 USC § 119(a) of Indian Provisional Application No. 201841031680, filed on Aug. 23, 2018 in the Indian Intellectual Property Office, Indian Patent Application No. 201841031680, filed on Aug. 20, 2019 in the Indian Intellectual Property Office, and Korean Patent Application No. 10-2019-0103841, filed on Aug. 23, 2019, in the Korean Intellectual Property Office, the entire disclosures of which are all incorporated herein by reference for all purposes.

BACKGROUND

1. Field

The following description relates to methods and system with deep learning model generation.

2. Description of Related Art

Deep learning is a machine learning technique. Generally, deep learning models are trained using large sets of labeled test data and may be generated with neural network architectures such as a Convolutional Neural Network (CNN), which can be trained through a dynamic learning of parameters for objective functionalities directly from the test data.

Designing of deep learning models with high accuracy and low computation requirements is a difficult task and has needed significant human expertise. Model-free Reinforcement Learning (RL) techniques have been applied to automatically generate neural networks with sufficient levels of accuracy. However, though such RL techniques have been applied, they require substantial memory and computational processing, and result in increasing more complex and memory and computational requiring resultant models

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented method includes identifying a plurality of connections in a neural network that is pre-associated with a deep learning model, generating a plurality of pruned neural networks by pruning different sets of one or more of the plurality of connections to respectively generate each of the plurality of pruned neural networks, generating a plurality of intermediate deep learning models by generating a respective intermediate deep learning model corresponding to each of the plurality of pruned neural networks, and selecting one of the plurality of intermediate deep learning models, having a determined greatest accuracy among the plurality of intermediate deep learning models, to be an optimized deep learning model.

The pruning of the different sets of the one or more of the plurality of connections may be performed based on predetermined pruning policies.

The predetermined pruning policies may be based a determined accuracy level of the optimized deep learning model.

The predetermined pruning policies may include at least one of a policy of pruning one or more connections for a predetermined time period or a policy of pruning connections until a threshold number of connections are pruned.

The pruning of the different sets of the one or more of the plurality of connections may include selecting, at random, respective combinations of two or more connections for pruning, and pruning each of the respective combinations based on the predetermined pruning policies.

The method may further include determining accuracy levels of each of the plurality of intermediate deep learning models to determine the greatest accuracy among the plurality of intermediate deep learning models.

The determining of the accuracy levels may include using a predetermined validation technique to determine the accuracy levels.

The predetermined validation technique may include determining an error level corresponding to each of the plurality of intermediate deep learning models.

The pruning may include assigning a zero value to each weight corresponding to each pruned connection.

Each of the plurality of intermediate deep learning models may be a subset of the deep learning model.

A total number of connections in an intermediate deep learning model, of the plurality of intermediate deep learning models, may be less than or equal to a total number of connections in the deep learning model.

The method may further include implementing the optimized deep learning model.

The method may further include determining the greatest accuracy based on an implementing of the one of the plurality of intermediate deep learning models.

In one general aspect, a computing system includes one or more processors, and a memory storing instructions, which when executed by the one or more processors, configure the one or more processors to identify a plurality of connections in a neural network that is pre-associated with a deep learning model, generate a plurality of pruned neural networks by implementing a pruning of different sets of one or more of the plurality of connections to respectively generate each of the plurality of pruned neural networks, generate a plurality of intermediate deep learning models by implementing a generation of a respective intermediate deep learning model corresponding to each of the plurality of pruned neural networks, and select one of the plurality of intermediate deep learning models, having a determined greatest accuracy among the plurality of intermediate deep learning models, to be an optimized deep learning model.

The pruning of the different sets of the one or of the plurality of connections may be performed based on predetermined pruning policies.

The one or more processors may be configured to update the predetermined pruning policies based a determined accuracy level of the optimized deep learning model.

The predetermined pruning policies may include at least one of a policy of pruning one or more connections for a predetermined time period or a policy of pruning connections until a threshold number of connections are pruned.

To perform the pruning of the different sets of the one or more of the plurality of connections, the one or more processors may be configured to select, at random, respective combinations of two or more connections for pruning, and prune each of the respective combinations based on the predetermined pruning policies.

The one or more processors may be further configured to determine accuracy levels of each of the plurality of intermediate deep learning models to determine the greatest accuracy among the plurality of intermediate deep learning models.

For the determining of the accuracy levels, the one or more processors may be configured to determine the accuracy levels using a predetermined validation technique.

The predetermined validation technique may include a determination of an error level corresponding to each of the plurality of intermediate deep learning models.

For the pruning, the one or more processors may be configured to assign a zero value to each weight corresponding to each pruned connection.

Each of the plurality of intermediate deep learning models may be a subset of the deep learning model.

A total number of connections in an intermediate deep learning model, of the plurality of intermediate deep learning models, may be less than or equal to a total number of connections in the deep learning model.

The foregoing summary is illustrative only and is not intended to be in any way limiting. Other features, aspects, and embodiments will be apparent from the following detailed description, the drawings, and the claims.

Figure 1:
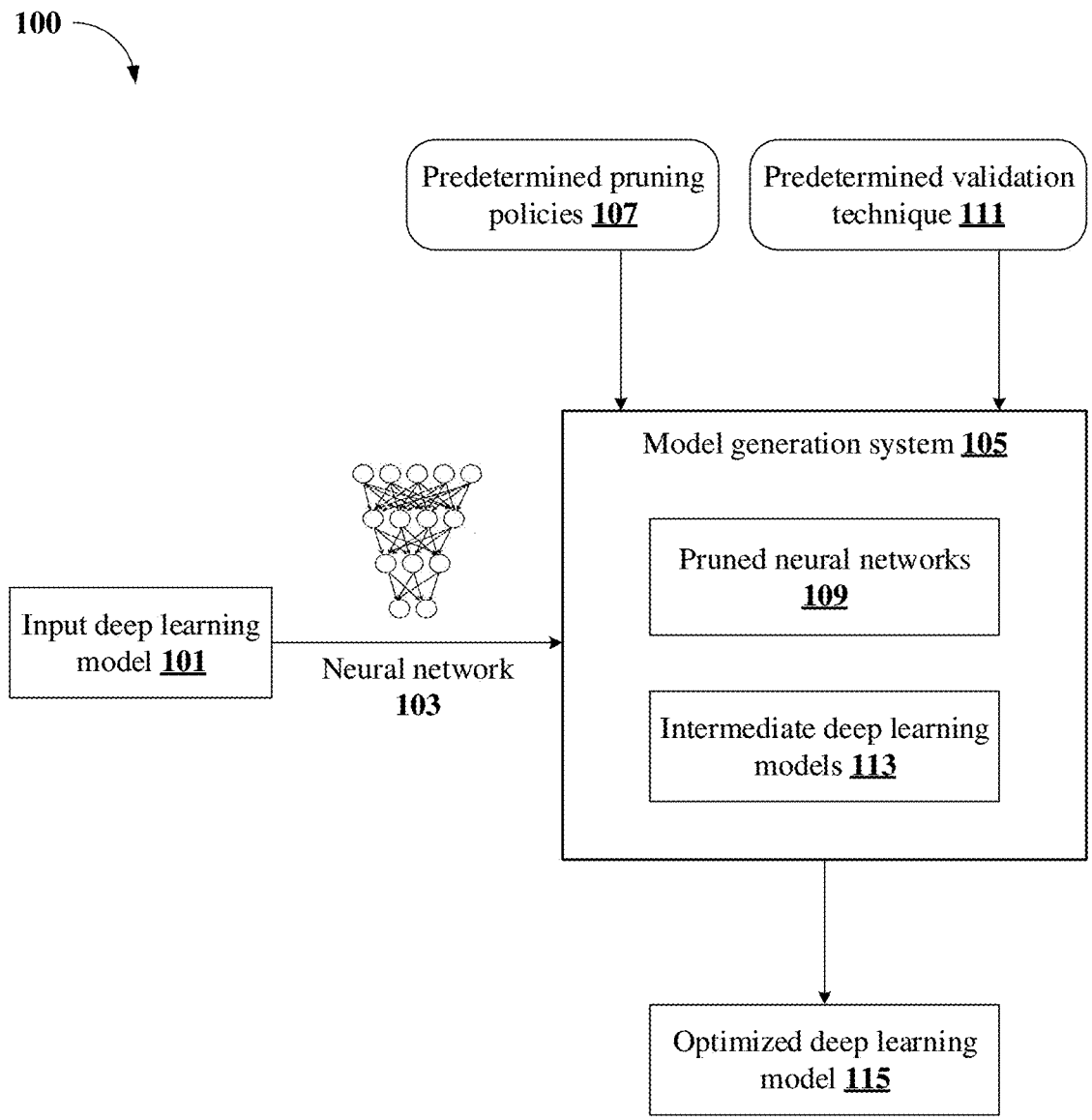
FIG. 1 illustrates a neural network system configured to generate an optimized deep learning model in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience. It should further be appreciated by those skilled in the art that any block diagrams herein represent examples and conceptual views of various example methods and systems configured to implement the aspects, features, operations described herein.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. When a single device or hardware element is described herein, examples include more than one devices/elements used in place of a single device/element. Similarly, where more than one device or hardware element is described herein, a single device/element may be used in place of the more than one device or element or a different number of devices/elements may be used instead of the shown number of devices or hardware elements. In examples, a functionality and/or the features of a device may be alternatively embodied by one or more other devices which are not explicitly described as having such functionality/features.

A description of an embodiment with several components in communication with each other is an example, as is not intended to be limiting of a requirement of all embdodiments to include all such components.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

In one or more examples a plurality of connections of one or more child neural networks, corresponding to a deep learning model, may be pruned based on predetermined pruning policies. Each of the plurality of connections that may be pruned may be connections in the neural network that are determined to be connections that if removed and/or masked from the neural network, the implementation of a corresponding neural network with those connections removed or masked would not produce a result that would represented a predetermined significant reduction in performance compared to the performance of the neural network without the pruning. Further, examples include generating a plurality of intermediate deep learning models corresponding to each of the plurality of pruned networks and then determining an accuracy level of each of plurality of intermediate deep learning models. Subsequently, one of the plurality of intermediate deep learning models having highest accuracy level may be selected as the optimized deep learning model. Such an optimized deep leaning model may thus be implemented with a reduction in computation and memory requirements compared to the implementation of the neural network without pruning, and may also provide sufficiently similar or even enhanced accuracy over the neural network without pruning. Further, with the reduction of the memory and computational requirements enabled by such pruning, a sophistication of an architecture of the neural network may be increased for greater accuracy and a corresponding optimized neural network may still have enhanced accuracy as the original neural network and require similar or still less memory and computational requirements compared to an implementation of the original neural network.

FIG. 1 illustrates a neural network system in accordance with one or more embodiments.

In an example, a neural network system 100 may include, without limiting to, a model generation system 105, an input deep learning model 101, and a neural network 103. In an example, a model generation system 105 may receive results of an implementation of neural network 103 with respect to input deep learning model 101 and generate an optimized deep learning model 115 comparable to the input deep learning model 101. In an example, the model generation system 105 may be configured for receiving the input deep learning model 101 (alternatively referred as 'deep learning model 101') and generate an optimized deep learning model 115 corresponding to the input deep learning model 101. In an example, the input deep learning model 101 may be a machine learning model, which is trained to perform a predetermined task such as, without limiting to, object identification, object tracking, image correlation, event detection and the like. Further, the input deep learning model 101 may be of different types in varying examples including, without limiting to, a supervised learning model, an unsupervised learning model, or a semi-supervised learning model. In an embodiment, the input deep learning model 101 may be associated with a neural network 103, which may be used for training the input deep learning model 101 for performing a specific task. For example, the neural network 103 may be trained to be a controller to control the implementation of the input deep learning model 101, such as to control setting or predicting parameters of the input deep learning model 101. The neural network 103 may also be trained through reinforcement learning based on reward signaling by the model generation system 105 based on accuracy, or loss or entropy, determinations of the intermediate deep learning models 113. The use of the term 'may' herein with respect to an aspect, feature, or operation of an example or embodiment, e.g., as to what an example or embodiment may include or implement or may perform, means that at least one example or embodiment exists where such an aspect, feature, or operation is included or implemented while all examples and embodiments are not limited thereto.

In an example, the model generation system 105 may analyze the neural network 103 corresponding to the input deep learning model 101 for identifying a plurality of connections in the neural network 103 that can be pruned or masked, hereinafter referred to as prunable connections. As an example, the plurality of prunable connections may be determined connections in the neural network 103 that are determined to be respective connections that, if removed and/or masked from the neural network 103, the implementation of the neural network 103 without one or more, or all, of the prunable connections would not result in a significant change in the result of the neural network 103, e.g., based on or more predetermined thresholds used to determine whether such changes in result or function are significant. In an example, after one or more, a minimum sparsity number, or all of the plurality of prunable connections have been identified, the model generation system 105 may prune one or more of the plurality of prunable connections and respectively generate each of the plurality of pruned neural networks 109. In an example, the respective pruning and/or masking of each of the one or more of the plurality of prunable connections may be implemented by assigning a 'zero' weightage to a parameter/weight of each pruned and/or masked connection. For example, there may be a non-zero weightage assigned to a prunable connection in the neural network 103, but after pruning and/or masking of that prunable connection the weightage of that prunable connection may be set to zero in a corresponding pruned neural network 109 while other connections in the corresponding pruned neural network 109 may have the same original weightage as in the neural network 103. In an example, the one or more pruned connections may respectively remain, e.g., for a predetermined time, in such inactive states variously in the plurality of pruned neural networks 109 until the weightage corresponding to the one or more pruned connections is returned to a 'non-zero' value by the model generation system 105.

In an example, respective pruning of the plurality of prunable connections may be performed based on predetermined pruning policies 107 configured in the model generation system 105 or provided to the model generation system 105. In an example, the predetermined pruning policies 107 may include a set of user-defined rules, which are considered by the model generation system 105 while pruning the one or more connections and generating the plurality of pruned neural networks. In an example, the predetermined pruning policies 107 may also be dynamically set or altered according to a determination of an application and/or task the input deep learning model 101 or depending on results of a review of the below discussed intermediate deep learning models 113 by the model generation system 105. As an example, the predetermined pruning policies 107 may include, without limiting to, a predetermined time period for which one or more of pruned and/or masked connections of one or more of the pruned neural networks 109 are maintained in the pruned/masked state, and/or a threshold number of connections which are to be pruned in one or more or all of the pruned neural networks 109. The threshold number may also be a set sparsity value which each of the pruned neural networks 109 must meet, even though they each have at least one pruning/masking difference from each other. For example, the predetermined time period may be 100 seconds, which means that the model generation system 105 is thereby set to continue to prune the neural network 103 for 100 seconds, again generating the plurality of pruned neural networks 109 at each iteration of the pruning. Similarly, the threshold number of connections for pruning may be 30% of the total number of connections in the neural network 103.

In an example, subsequent to pruning of the neural network 103 and generating the pruned neural networks 109, the model generation system 105 may respectively generate a plurality of intermediate deep learning models 113 corresponding to each of the plurality of pruned neural networks 109. For example, each of the pruned neural networks may be respectively implemented or used to generate a corresponding intermediate deep learning model 113. Each intermediate deep learning model 113 may also be generated upon respective completion of the corresponding pruned neural network 109. Thus, at the end of pruning, the model generation system 105 may have generated the plurality of intermediate deep learning models 113 that are respectively comparable to the input deep learning model 101 but which have each been generated from different pruned/masked variations of the neural network 103. Thereafter, the model generation system 105 may determine an accuracy level of each of the plurality of intermediate deep learning models 113 for selecting one of the plurality of intermediate deep learning models 113 as an optimized variant of the input deep learning model 101. In an embodiment, the accuracy level of each of the plurality of intermediate deep learning models 113 may be respectively determined using a predetermined validation technique 111. As an example, the predetermined validation technique 111 may include, without limiting to, determining error level corresponding to each of the plurality of intermediate deep learning models 113. Further, the error level corresponding to each of the plurality of intermediate deep learning models 113 may be determined based using a predetermined error or loss function associated with the input deep learning model 101.

In an embodiment, upon validating each of the plurality of intermediate deep learning models 113, the model generation system 105 may select one of the plurality of intermediate deep learning models 113, having highest accuracy level among the plurality of intermediate deep learning models 113, as being an optimized deep learning model 115 corresponding or comparable to the input deep learning model 101. Here, due to the various pruning and/or masking of the neural network 103, each of the intermediate deep learning models 113 may be computationally less complex deep learning models than the input deep learning model 101 and still achieve a same trained objective or functionality as the input deep learning model 101, without a reduced accuracy compared to the input deep learning model 101 or without a significantly, e.g., based on a predetermined threshold, reduced accuracy compared to the input deep learning model 101.

Figure 2:
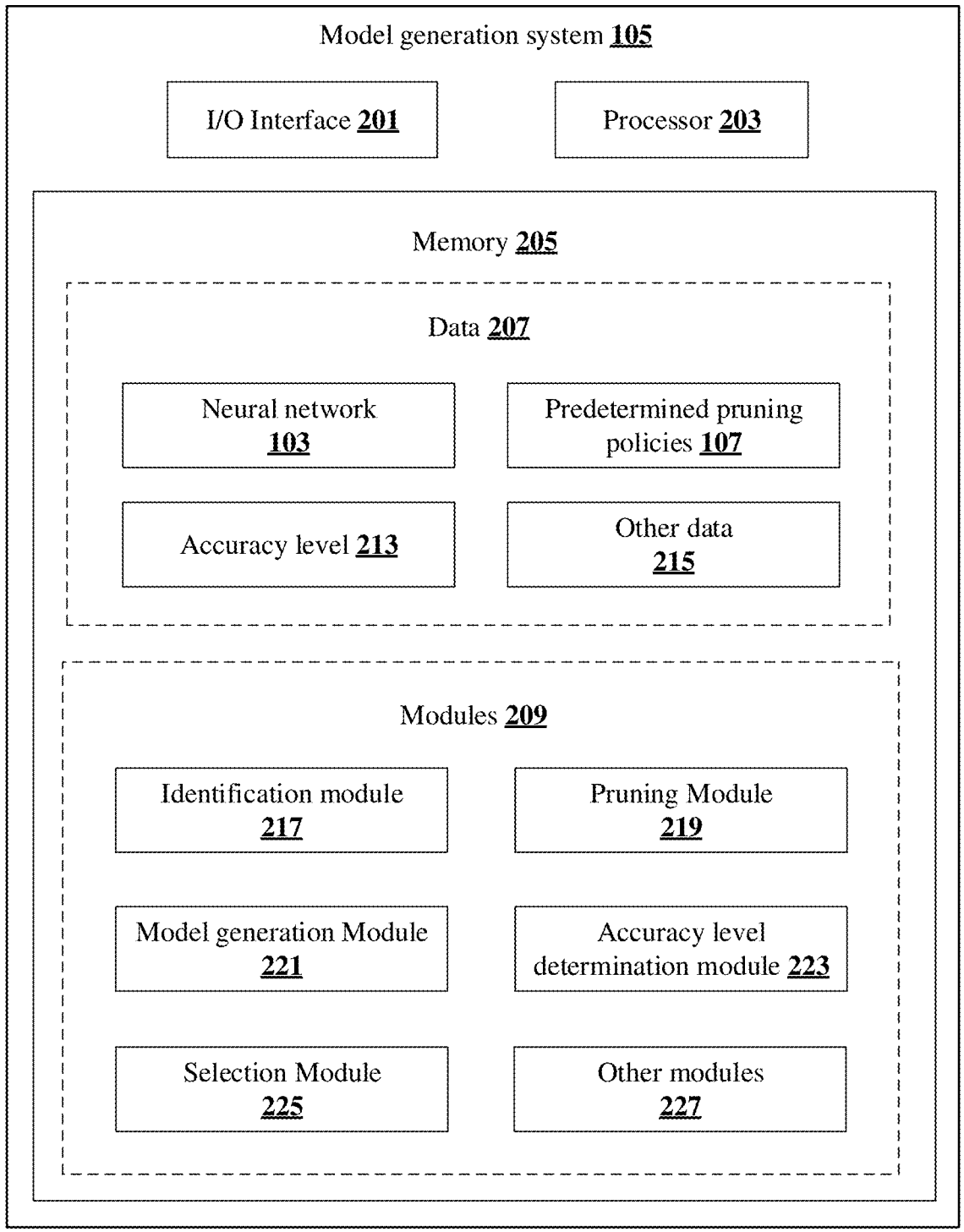
FIG. 2 shows a detailed block diagram illustrating a model generation system in accordance with one or more embodiments.

FIG. 2 shows a detailed block diagram illustrating a model generation system in accordance with one or more embodiments. Below, while examples of the model generation system will be explained through reference to the input deep learning model 101, neural network 103, and model generation system 105 of FIG. 1, it is noted that examples are not limited thereto.

In an example, the model generation system 105 may include an I/O interface 201, a processor 203, and a memory 205. The I/O interface 201 may be configured to receive an input deep learning model 101, a corresponding neural network 103, and/or text characterization of parameter indicating/predicting results of the neural network 103, for which a corresponding optimized deep learning model 115 may be generated. The memory 205 may be communicatively coupled to the processor 203 and may store data 207 and one or more modules 209. The processor 203 may be configured to perform one or more functions of the model generation system 105 for generating an optimized deep learning model 115, using the data 207 and the one or more modules 209. References to a processor herein are also references to various examples where there are one, two, or more processors or processing devices. Similarly, references to a processor implemented method of one or more or all operations described herein, e.g., by any of the apparatuses or processors herein as non-limiting examples, similarly refer to various example implementations that include implementations of all or respective operation(s) in one or two or more such processors or processing devices.

In an example, the data 207 may include, without limitation, the neural network 103, predetermined pruning policies 107, accuracy level 213, and other data 215. The memory 205 may also store the input deep learning model 101. Neural networks may be stored as information indicating the respective hyperparameters that identify the respective architecture of the neural networks along with corresponding parameters, as non-limiting examples. In an example, the data 207 may be stored within the memory 205 in the form of various data structures. Additionally, the data 207 may be organized using data models, such as relational or hierarchical data models. The other data 215 may store various temporary data and files generated by the one or more modules 209, for example, while performing and resulting from various operations of the model generation system 105. As an example, the other data 215 may also include, without limiting to, a plurality of training deep learning models, training neural networks, resultant pruned neural networks 109, resultant intermediate deep learning models 113, the predetermined validation technique 111 and the like.

In an example, each of the input deep learning model 101 and the neural network 103 may each have a plurality of connections arranged with respect to a plurality of levels or layers, which may be, or have been, collectively, or variously separately, trained for performing a predetermined task or objective. For example, the neural network 103 may be, or have been, trained for an objective of predicting parameters of for the input deep learning model 101, and may be trained based on reinforced learning through a reward signaling dependent on at least one generated intermediate deep learning model 113, such as through a REINFORCE gradient algorithm. In an example, the model generation system 105 prunes and/or masks various connections of a trained neural network 103 to generate the pruned neural networks 109, which are used to generate respective intermediate deep learning models 113, and stores a selected one or more of the respective intermediate deep learnings models as an optimized deep learning model 115 and/or uses the optimized deep learning model 115 in a current or subsequent inference operation of the model generation system 105.

In an example, the predetermined pruning policies 107 may include rules and conditions to be considered by the model generation system 105 to control the pruning of one or more of the plurality of connections in the neural network 103. As an example, the predetermined pruning policies 107 may include, without limiting to, a predetermined time period for which the one or more connections are to be selected for pruning and a threshold number of connections which are to be pruned neural network 103.

In an example, the accuracy level 213 may be information that indicates the accuracy of the neural network 103 and/or the input deep learning model 101 corresponding to the neural network 103. As an example, the accuracy level 213 of the neural network 103 may be determined based on the accuracy with which the neural network 103 is performing a predetermined task or trained objective. For example, while the neural network 103 may be trained for a task or objective with respect or associated with the input deep learning model 101, such as a non-limiting prediction of parameters of one or more levels or layers of the input deep learning model 101. In another example the neural network 103 may be a neural network trained for a different task or trained objective, e.g., including an example where the input deep learning model 101 may not exist. In an example, the accuracy level 213 may be computed using a predetermined loss function associated with the neural network 103.

In an example, the data 207 may be processed by the one or more modules 209. In an example, the one or more modules 209 may be communicatively coupled to the processor 203 which may thereby be configured to perform, or the modules 209 may respectively be configured to perform, one or more or all operations discussed herein, such as any or all of the operations discussed herein with respect to the model generation system 105. In an example, the one or more modules 209 may include, without limiting to, an identification module 217, a pruning module 219, a model generation module 221, an accuracy level determination module 223, a selection module 225 and other modules 227.

As used herein, the term module respectively refers to any or any combination of an Application Specific Integrated Circuit (ASIC), an electronic circuit, one or more processors (shared, dedicated, or group), a combinational logic circuit, any other hardware component that is configured to provide such described functionality, and a memory (or the memory 205) that stores instructions or firmware, which when executed by such one or more processors and/or the processor 203, for example, configures that one or more processors and/or the processor 203 to implement one or more or all such respective functionalities discussed herein. In an example, the other modules 227 may be configured to perform various miscellaneous functionalities of the model generation system 105. It will be appreciated that such one or more modules 209 may be represented as a single module or any combination of at least two different modules.

In an example, the identification module 217 may be configured to identify a plurality of connections, e.g., including all of the prunable and non-prunable connections, in the neural network 103 corresponding to the input deep learning model 101, for example. Additionally, the identification module 217 may be configured for identifying one or more prunable connections among the plurality of connections in the neural network 103, based on the predetermined pruning policies 107.

In an example, the pruning module 219 may be configured to prune any of the identified one or more prunable connections from the neural network 103. As a non-limiting example, pruning the neural network 103 may include selecting, at random, a combination of the one or more prunable connections among the plurality of connections for pruning. Subsequently, each of the selected combinations of the one or more prunable connections may be iteratively pruned according to the predetermined pruning policies 107. In an example, the predetermined pruning policies 107 may include, without limiting to, at least one of pruning the one or more prunable connections for a predetermined time period or pruning the one or more prunable connections until a threshold number of connections are pruned.

In an example, the pruning module 219 may prune the plurality of prunable connections by respectively assigning a zero value to each of the weights corresponding to the plurality of prunable connections. The pruning module 219, or each of plural respective pruning modules 219, may thus selectively prune prunable connections of the neural network 103. Further, at each iteration of pruning, the pruning module(s) 219 may have thereby generated a corresponding plurality of pruned neural networks 109, where each of the plurality of pruned neural networks 109 may have a different or non-identical set of pruned connections.

In an example, the model generation module 221 may be configured to generate an intermediate deep learning model for a corresponding pruned neural network 109, or may be configured to generate a plurality of intermediate deep learning models 113 corresponding to each of a plurality or all of the pruned neural networks 109. In an example, each of the intermediate deep learning models 113 may be considered as a subset of the input deep learning model 101. That is, since each of the plurality of intermediate deep learning models 113 are generated dependent on different pruning of one or more connections of the neural network 103, the respective total number of connections in each of the plurality of intermediate deep learning models 113 may be less than or equal to the total number of connections in the input deep learning model 101. An intermediate deep learning model 113 being a subset of the input deep learning model 101 may include the intermediate deep learning model 113 having a same architecture as the input deep learning model 101. Further, an accuracy level 213 of each of the plurality of intermediate deep learning models 113 may be determined using the accuracy level determination module 223. In an example, the accuracy level determination module 223 may be configured to implement a predetermined validation technique 111 for determining the accuracy level 213. As a non-limiting example, the predetermined validation technique 111 may include, without limiting to, determining error level corresponding to each of the plurality of intermediate deep learning models 113.

In an example, the selection module 225 may be configured to select one of the plurality of intermediate deep learning models 113 to be the optimized deep learning model 115. In an example, the one of the plurality of intermediate deep learning models 113 may be selected based on the determination of the respective accuracy level 213 of each of the plurality of intermediate deep learning models 113. As an example, the selecting of the one of the plurality of intermediate deep learning models 113 may include selecting the intermediate deep learning model 113 that has a determined greatest accuracy level 213 among the plurality of intermediate deep learning models 113. Thus, this selected one intermediate deep learning model may be determined to be the optimized deep learning model 115. In an example, subsequent to the selecting of the optimized deep learning model 115, the pruning policies may be dynamically updated based on the determined accuracy level 213 of the selected one intermediate deep learning model 113. Thereafter, the model generation system 105 may use the updated pruning policies to again identify a new plurality of prunable connections of the neural network 103, generate new pruned neural networks 109 based on the new plurality of prunable connections, generate new intermediate deep learning models 113 based on the new pruned neural networks 109, and select a new one of the new intermediate deep learning models 113. In an example, information may be determined of each of a plurality of the selected one intermediate deep learning models 113 and respectively used by the model generation system 105 to train the neural network 103 through reinforcement learning.

Figure 3:
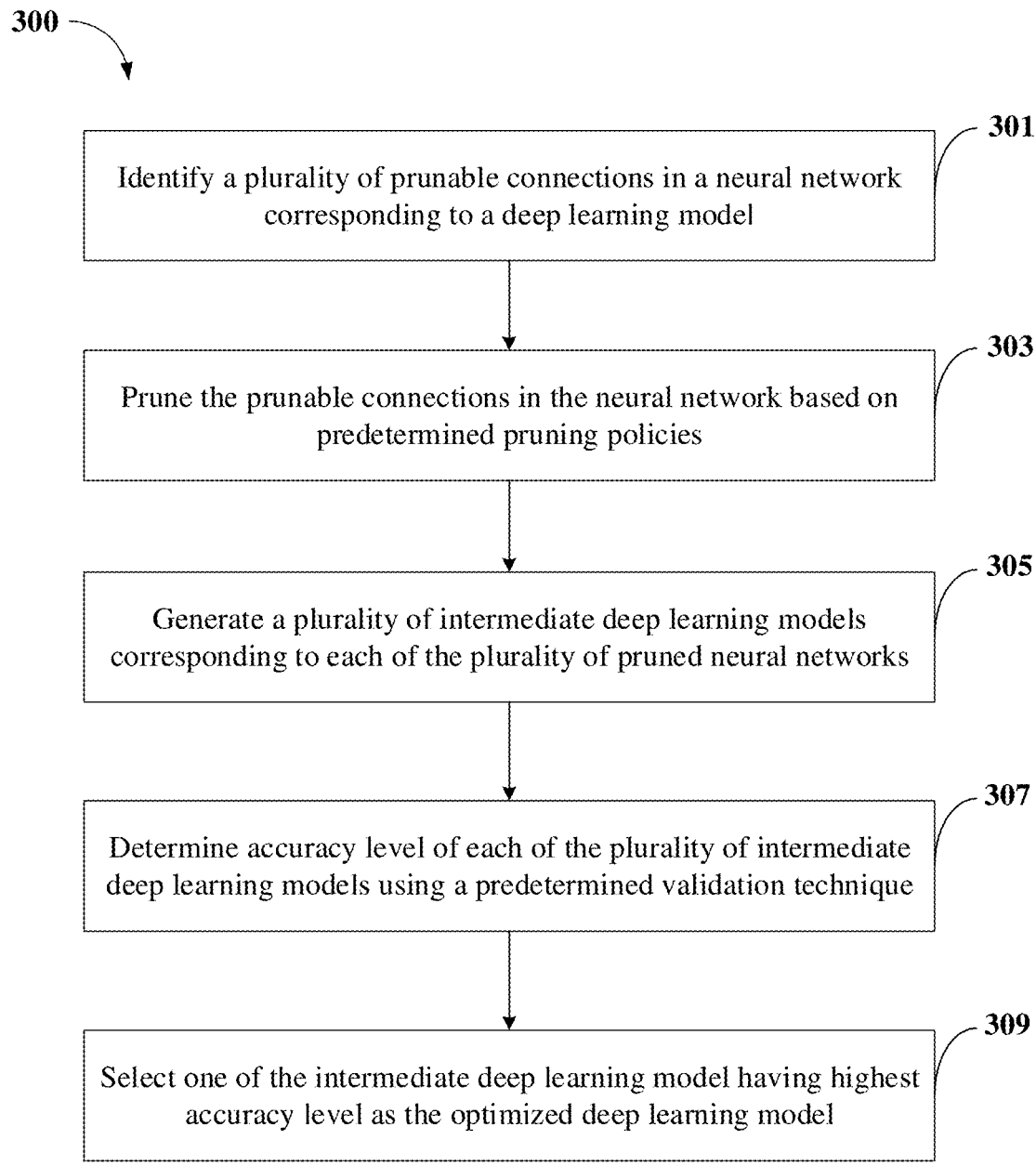
FIG. 3 shows a flowchart illustrating a method of generating an optimized deep learning model in accordance with one or more embodiments.

FIG. 3 shows a flowchart illustrating a method of generating an optimized deep learning model in accordance with one or more embodiments.

Below, while examples of the method 300 will be explained with reference to the model generation system 105 of FIG. 1 and/or FIG. 2, it is respectfully noted that examples are not limited thereto.

The order in which the method 300 is described below is not intended to be construed as a limitation, and any number of the described method operations may be combined in any order to implement the method. Additionally, individual operations may respectively not be included in one or more examples without departing from the spirit and scope of the subject matter described herein.

In operation 301, the model generation system 105 may identify a plurality of prunable connections in a neural network 103, e.g., corresponding to a deep learning model. As an example, the plurality of prunable connections may be the connections in the neural network 103, which may be determined to be removable and/or masked from the neural network 103, without determinatively significantly changing a result or operation of the neural network 103.

In operation 303, the model generation system 105 may selectively prune one or more connections of the plurality of prunable connections in the neural network 103 based on predetermined pruning policies 107 and generate a plurality of pruned neural networks 109. In an example, the predetermined pruning policies 107 may include, without limiting to, at least one of pruning the one or more prunable connections for a predetermined time period or pruning the one or more prunable connections until a threshold number of connections are pruned. Further, the pruning of the one or more prunable connections may include selecting, at random, a combination of the one or more prunable connections for pruning and then pruning each selected combination of the one or more prunable connections based on the predetermined pruning policies 107.

In operation 305, the model generation system 105 may respectively generate a plurality of intermediate deep learning models 113 corresponding to each of the plurality of pruned neural networks 109. In an example, pruning the plurality of prunable connections may include assigning a zero value to each respective weight corresponding to the one or more prunable connections.

In operation 307, the model generation system 105 may determine respective accuracy levels 213 of each of the plurality of intermediate deep learning models 113, e.g., using a predetermined validation technique 111. As an example, the predetermined validation technique 111 may include determining a respective error level corresponding to each of the plurality of intermediate deep learning models 113.

In operation 309, the model generation system 105 may select one of the plurality of intermediate deep learning models 113, having a highest or greatest accuracy level 213 among the plurality of intermediate deep learning models 113, as the optimized deep learning model 115.

In an example, the predetermined pruning policies 107 may be updated based on accuracy level 213 of the optimized deep learning model 115. For example, the updating of the pruning policies 107 may further include updating, e.g., training or tuning, the neural network 103 through plural repetitions of operations 301-309 and generation of respective reward information to iteratively update the neural network 103 through reinforcement learning according to an automatic speech recognition objective. For example, dependent on a predetermined accuracy threshold for a selected intermediate deep learning model generated in one of such plural repetition the iterative updating may be completed and the selected intermediate deep learning model output as the optimized deep learning model 115. In addition, the disclosed methods herein may thus automatically generate an optimized neural network model, that may execute faster and use less energy and resources than an implementation of an original deep learning model corresponding to the original neural network 103. For example, through one or more methods described herein, accuracy of a deep learning model may be enhanced without causing a proportional increase of memory and/or computation costs of the deep learning model. In an example, the model generation system 105 may automatically generate optimized deep learning models based on input dataset and corresponding labels provided to it, and examples may generate optimized deep learning models without a human interaction to design and train the models.

Figure 4:
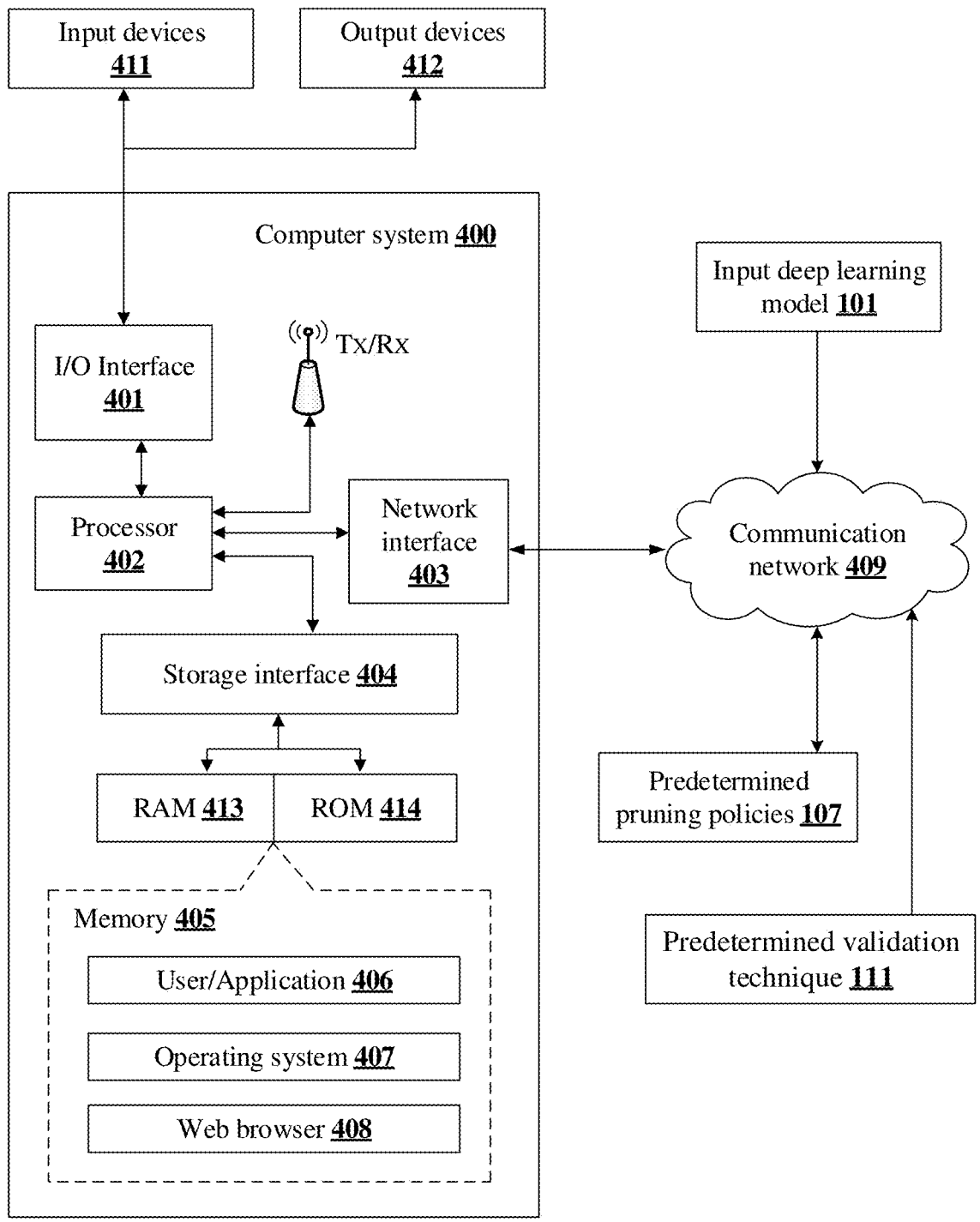
FIG. 4 illustrates a block diagram of a computing system in accordance with one or more embodiments.

FIG. 4 illustrates a block diagram of computing system according to one or more embodiments. In an example, a computer system 400 of the computing system may be the model generation system 105 of any of FIGS. 1-3, for example. The computer system 400 may include a central processing unit ("CPU" or "processor") 402. The processor 402 may include at least one data processor, which upon executing corresponding stored instructions or program, is configured to implement user- or system-generated interface processes, for example. The processor 402 may include specialized processing devices, including one or more of integrated system (bus) controllers, memory management control units, floating point units, graphics processing units, digital signal processing units, etc.

The processor 402 is configured to be in communication with one or more input/output (I/O) devices (411 and 412) via I/O interface 401. The I/O interface 401 is configured to employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In one or more examples, the processor 402 is configured to be in communication with a communication network 409 via a network interface 403. The network interface 403 may be configured to communicate with the communication network 409. The network interface 403 may be configured to employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. As a non-limiting example, the network interface 403 and the communication network 409, the computer system 400 may receive an input deep learning model 101, predetermined pruning policies 107 and predetermined validation technique 111 required for generating the optimized deep learning model 115.

In an example, the communication network 409 may be implemented as one of the several types of networks, such as intranet or Local Area Network (LAN). For example, the communication network 409 may be a dedicated network or a shared network, and be configured to provide an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In one or more examples, the processor 402 may be configured to be in communication with a memory 405 (e.g., RAM 413, ROM 414, etc. as shown in FIG. 4) using a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of instructions, firmware, programs, and/or or database components, including, without limitation, user/application interface 406, an operating system 407, a web browser 408, and the like, in addition to the above discussion regarding the storing or instructions and/or firmware in the computer system 400, which when executed by one or more processors, configures the one or more processors to perform any one, any combination, or all operations described herein. In some examples, computer system 400 may store user/application data 406, such as the data, variables, records, etc. as described in this invention. Such databases may be implemented as fault-tolerant, relational, scalable, secure databases such as Oracle® or Sybase®.

The operating system 407 may be configured to provide or facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may be configured to provide or facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

The model generation systems, the model generation system 105, I/O interfaces 201, processors, processor 203, memories, memory 205, modules, modules 209, computing system, input devices 411, output devices 412, computer system 400, communication network 409, network interface 403, processor 402, I/O interface 401, storage interface 404, RAM 413, ROM 414, and memory 405, and other apparatuses, modules, units, devices, and other components described herein with respect to FIGS. 1-4 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIGS. 1-4 and that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blueray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method, the method comprising:
   identifying a plurality of connections in a neural network that is pre-associated with a deep learning model;
   determining different sets, each set comprising a different combination of one or more of the identified plurality of connections;
   generating a plurality of pruned neural networks by iteratively pruning the determined different sets of one or more of the plurality of connections to respectively generate each of the plurality of pruned neural networks;
   generating a plurality of intermediate deep learning models by generating a respective intermediate deep learning model corresponding to each of the plurality of pruned neural networks;
   determining an accuracy level of each of the plurality of intermediate deep learning models to determine a greatest accuracy among the plurality of intermediate deep learning models; and selecting, based on the determined accuracy level of each of the plurality of the intermediate deep learning models, one of the plurality of intermediate deep learning models, having the determined greatest accuracy from among the plurality of intermediate deep learning models, as an optimized deep learning model, wherein a first intermediate deep learning model is generated corresponding to a first pruned neural network and a second intermediate deep learning model is generated corresponding to a second pruned neural network, and wherein the first intermediate deep learning model has a greater accuracy level than the second intermediate deep learning model and is selected as the optimized deep learning model.

2. The method of claim 1, wherein the pruning of the different sets of the one or more of the plurality of connections is performed based on predetermined pruning policies.

3. The method of claim 2, further comprising updating the predetermined pruning policies based on a determined accuracy level of the optimized deep learning model.

4. The method of claim 2, wherein the predetermined pruning policies comprise at least one of a policy of pruning one or more connections for a predetermined time period or a policy of pruning connections until a threshold number of connections are pruned.

5. The method of claim 2, wherein the pruning of the different sets of the one or more of the plurality of connections comprises:

selecting, at random, respective combinations of two or more connections for pruning; and pruning each of the respective combinations based on the predetermined pruning policies.

6. The method of claim 1, wherein the determining of the accuracy levels includes using a predetermined validation technique to determine the accuracy levels.

7. The method of claim 6, wherein the predetermined validation technique comprises determining an error level corresponding to each of the plurality of intermediate deep learning models.

8. The method of claim 1, wherein the pruning includes assigning a zero value to each weight corresponding to each pruned connection.

9. The method of claim 1, wherein each of the plurality of intermediate deep learning models is a subset of the deep learning model.

10. The method of claim 9, wherein a total number of connections in an intermediate deep learning model, of the plurality of intermediate deep learning models, is less than or equal to a total number of connections in the deep learning model.

11. The method of claim 1, further comprising implementing the optimized deep learning model.

12. The method of claim 11, further comprising determining the greatest accuracy based on an implementing of the one of the plurality of intermediate deep learning models.

13. A computing system, the system comprising:
one or more processors; and
a memory storing instructions, which when executed by the one or more processors, configure the one or more processors to:
identify a plurality of connections in a neural network that is pre-associated with a deep learning model;
determine different sets, each set comprising a different combination of one or more of the identified plurality of connections;

generate a plurality of pruned neural networks by implementing an iterative pruning of the determined different sets of one or more of the plurality of connections to respectively generate each of the plurality of pruned neural networks;

generate a plurality of intermediate deep learning models by implementing a generation of a respective intermediate deep learning model corresponding to each of the plurality of pruned neural networks;

determine accuracy levels of each of the plurality of intermediate deep learning models to determine a greatest accuracy among the plurality of intermediate deep learning models; and select one of the plurality of intermediate deep learning models, having the determined greatest accuracy among the plurality of intermediate deep learning models, as an optimized deep learning model, wherein a first intermediate deep learning model is generated corresponding to a first pruned neural network and a second intermediate deep learning model is generated corresponding to a second pruned neural network, and wherein the first intermediate deep learning model has the greater accuracy than the second intermediate deep learning model and is selected as the optimized deep learning model.

14. The system of claim 13, wherein the one or more processors are configured to perform the pruning of the different sets of the one or of the plurality of connections based on predetermined pruning policies.

15. The system of claim 14, wherein the one or more processors are configured to update the predetermined pruning policies based on a determined accuracy level of the optimized deep learning model.

16. The system of claim 14, wherein the predetermined pruning policies comprise at least one of a policy of pruning one or more connections for a predetermined time period or a policy of pruning connections until a threshold number of connections are pruned.

17. The system of claim 14, wherein, to perform the pruning of the different sets of the one or more of the plurality of connections, the one or more processors are configured to:
select, at random, respective combinations of two or more connections for pruning; and
prune each of the respective combinations based on the predetermined pruning policies.

18. The system of claim 13, wherein, for the determining of the accuracy levels, the one or more processors are configured to determine the accuracy levels using a predetermined validation technique.

19. The system of claim 18, wherein the predetermined validation technique comprises a determination of an error level corresponding to each of the plurality of intermediate deep learning models.

20. The system of claim 13, wherein, for the pruning, the one or more processors are configured to assign a zero value to each weight corresponding to each pruned connection.

21. The system of claim 13, wherein each of the plurality of intermediate deep learning models is a subset of the deep learning model.

22. The system of claim 21, wherein a total number of connections in an intermediate deep learning model, of the plurality of intermediate deep learning models, is less than or equal to a total number of connections in the deep learning model.

* * * * *